(12) United States Patent
Barnett et al.

(10) Patent No.: US 10,956,375 B2
(45) Date of Patent: Mar. 23, 2021

(54) SHUFFLING FILE DIGESTS STORED IN DATA STORES OF A DISTRIBUTED FILE SYSTEM

(71) Applicant: EMC IP Holding Company LLC, Hopkinton, MA (US)

(72) Inventors: Alan Barnett, County Cork (IE); Donagh A. Buckley, County Cork (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 162 days.

(21) Appl. No.: 16/033,603

(22) Filed: Jul. 12, 2018

(65) Prior Publication Data
US 2020/0019624 A1     Jan. 16, 2020

(51) Int. Cl.
  *G06F 16/182*     (2019.01)
  *G06F 16/11*      (2019.01)
  *G06F 16/13*      (2019.01)
  *G06F 16/185*     (2019.01)

(52) U.S. Cl.
  CPC ......... *G06F 16/182* (2019.01); *G06F 16/119* (2019.01); *G06F 16/134* (2019.01); *G06F 16/137* (2019.01); *G06F 16/185* (2019.01)

(58) Field of Classification Search
  CPC .............. G06F 16/182; G06F 16/901; G06F 16/90335; G06F 16/2477; G06F 16/119; G06F 16/134; G06F 16/137; G06F 16/185; G06F 21/6218
  See application file for complete search history.

(56) References Cited

U.S. PATENT DOCUMENTS

| 7,162,571 | B2 * | 1/2007 | Kilian | G06F 3/0611 |
| | | | | 711/108 |
| 8,938,416 | B1 * | 1/2015 | Cole | G06F 16/283 |
| | | | | 707/607 |
| 9,471,595 | B1 * | 10/2016 | Vempati | G06F 3/0619 |
| 2004/0143595 | A1 * | 7/2004 | Cherkasova | H04L 67/1095 |
| 2011/0137930 | A1 * | 6/2011 | Hao | G06F 16/9024 |
| | | | | 707/769 |

(Continued)

OTHER PUBLICATIONS

J.R. Lorch et al., "Shroud: Ensuring Private Access to Large-Scale Data in the Data Center," Proceedings of the 11th USENIX Conference on File and Storage Technologies (FAST), Feb. 12-15, 2013, pp. 199-214.

(Continued)

*Primary Examiner* — Cam Y T Truong
(74) *Attorney, Agent, or Firm* — Ryan, Mason & Lewis, LLP

(57) ABSTRACT

A method includes receiving, at a content provisioning system from one or more client devices, one or more requests for file digests stored in respective data stores of a plurality of data stores in a distributed file system. The file digests are distributed across different ones of the plurality of data stores in the distributed file system. The method also includes determining a location of a given one of the requested file digests in one or more of the plurality of data stores and retrieving the given file digest from the determined location. The method further includes shuffling the distribution of the file digests across the plurality of data stores in the distributed file system.

20 Claims, 12 Drawing Sheets

(56) References Cited

U.S. PATENT DOCUMENTS

| | | | | |
|---|---|---|---|---|
| 2016/0044108 | A1* | 2/2016 | Vermeulen | H04L 67/42 |
| | | | | 709/218 |
| 2017/0031988 | A1* | 2/2017 | Sun | G06F 16/24554 |
| 2017/0249781 | A1* | 8/2017 | Wald | G06T 17/005 |
| 2018/0157521 | A1* | 6/2018 | Arikatla | G06F 9/45558 |

OTHER PUBLICATIONS

S. De Capitani Di Vimercati et al., "Shuffle Index: Efficient and Private Access to Outsourced Data," ACM Transactions on Storage (TOS)—Special Issue USENIX FAST, Nov. 2015, 55 pages, vol. 11, No. 4.

Escudo-Cloud, "Enforceable Security in the Cloud to Uphold Data Ownership," http://www.escudo-cloud.eu/, downloaded May 30, 2018, 3 pages.

S. De Capitani Di Vimercati et al., "Efficient and Private Access to Outsourced Data," Proceedings of the 31st International Conference on Distributed Computing Systems (ICDCS), Jun. 20-24, 2011, pp. 710-719.

* cited by examiner

SHUFFLING FILE DIGESTS STORED IN DATA STORES OF A DISTRIBUTED FILE SYSTEM

FIELD

The field relates generally to information processing systems, and more particularly to management of content provisioning.

BACKGROUND

Information processing systems increasingly utilize reconfigurable virtual resources to meet changing user needs in an efficient, flexible and cost-effective manner. For example, cloud computing and storage systems implemented using virtual machines have been widely adopted. Other virtual resources now coming into use in information processing systems include Linux containers. Such containers may be used to provide at least a portion of the virtualization infrastructure of a given information processing system. However, significant challenges arise in deployment of virtualization infrastructure in multi-tenant environments. For example, it can be difficult to manage content provisioning for data stored in distributed file systems such as cloud computing environments.

SUMMARY

Illustrative embodiments of the present invention provide techniques for managing content provisioning through obfuscation of the physical storage locations of file digests. Embodiments advantageously provide enhanced security for content provisioning utilizing distributed file systems.

In one embodiment, a method comprises receiving, at a content provisioning system from one or more client devices, one or more requests for file digests stored in respective data stores of a plurality of data stores in a distributed file system. The file digests are distributed across different ones of the plurality of data stores in the distributed file system. The method also comprises determining a location of a given one of the requested file digests in one or more of the plurality of data stores and retrieving the given file digest from the determined location. The method further comprises shuffling the distribution of the file digests across the plurality of data stores in the distributed file system. The method is performed by at least one processing device comprising a processor coupled to a memory.

These and other illustrative embodiments include, without limitation, methods, apparatus, networks, systems and processor-readable storage media.

DETAILED DESCRIPTION

Figure 1:
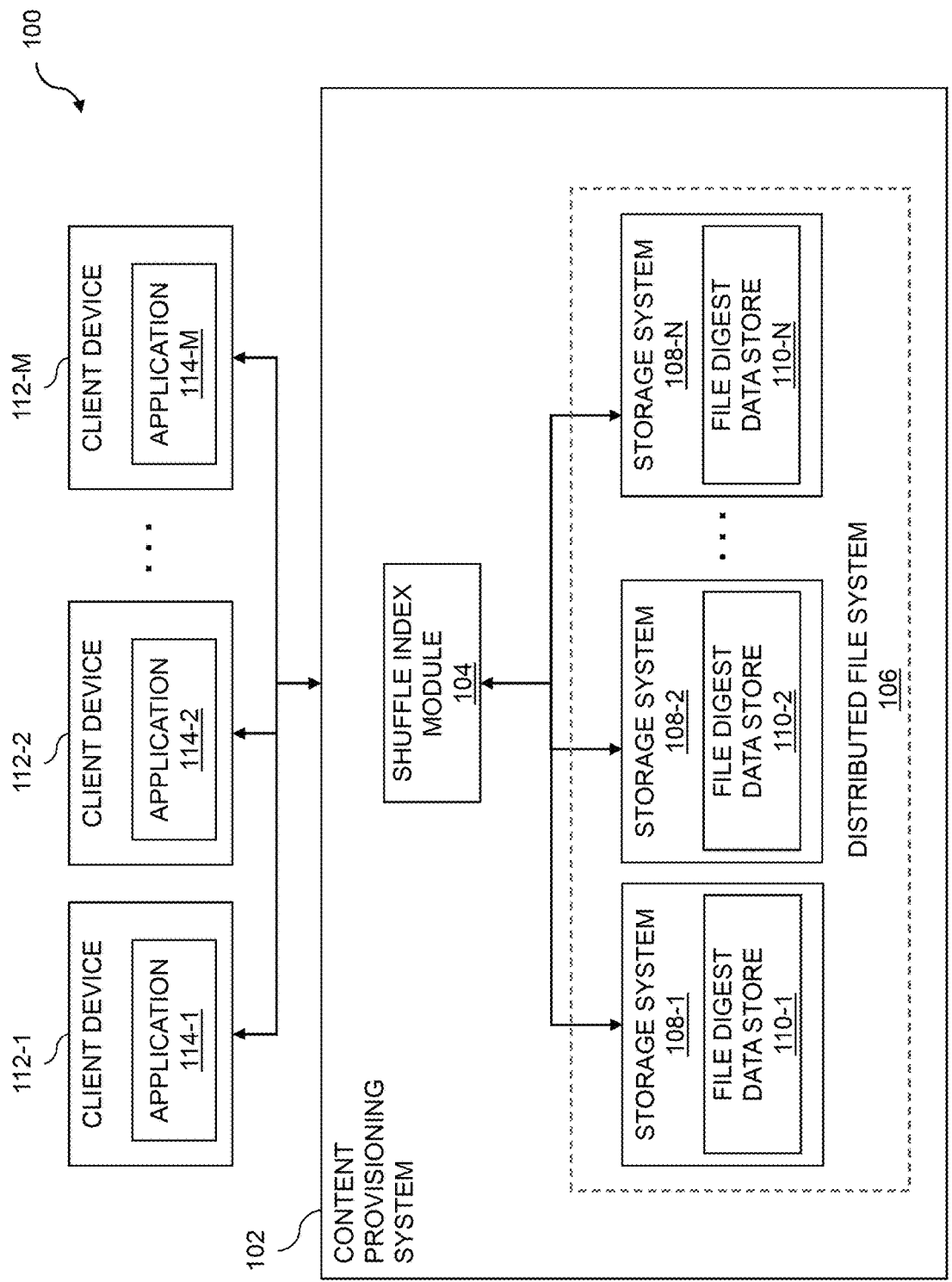
FIG. 1 is a block diagram of an information processing system including a content provisioning system providing functionality for obfuscating the physical storage locations of file digests through a shuffle index in an illustrative embodiment of the invention.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Content provisioning systems are becoming increasingly distributed, such as due to the adoption of cloud computing technology and other types of distributed processing platforms and information processing systems. Distributed file systems used by such content provisioning systems must maintain mappings between a file's identity and that file's location, for which a table or multiple tables may be used. An additional concern for content provisioning systems is in determining whether a file in question is authentic. This may involve attempting to answer a number of questions, such as (i) determining whether a file has been tampered with during transmission (e.g., such as due to a man in the middle attack between a file vendor and a client device), and (ii) if a file vendor has been compromised and is not yet aware of the breach, determining whether authentic files have been replaced with malicious ones, or more generally identifying files that are not authentic. One solution for the above problems is to use hash values, checksums or other file digests that may be used as a unique identifier for a file and as a guarantee of a file's authenticity.

When a client device downloads a file from a distributed file network, the request may pass through one or more application programming interfaces (APIs), such as a file digest or hash table API that links to an actual file digest table, hash table or other data structure which stores associations between file digests or hashes and file locations. The hash table, for example, may be in the form of an index that stores the mapping between unique identifiers and file locations. In some embodiments, the file hashes themselves illustratively act as the unique identifiers for the files. This architecture may be implemented as a distributed hash table (DHT) that efficiently maps indexes between universally unique identifiers (UUIDs) (e.g., file hashes) and file locations over a potentially very large distributed storage system. The DHT is also capable of adapting to the addition or removal of files from the distributed storage system.

In a content provisioning system where file access is limited to certain authorized users, an attacker or malicious user who wishes to gain access to a restricted file would first need to obtain the relevant hash UUID from the DHT storage blocks. The term "user" herein is intended to be broadly construed so as to encompass numerous arrangements of human, hardware, software or firmware entities, as well as combinations of such entities. In some embodiments, a shuffle index is implemented which regularly swaps these hash values between various storage bricks or locations, thus increasing the difficulty in pinning down the physical location of a given hash value while simultaneously maintaining the logical structure of the hash table or tables themselves.

Advantageously, file digests such as hash values can also be used as a guarantee that a given file has not been tampered with, as the user who downloads the given file can run the given file through a suitable function (e.g., a cryptographic hash function) and compare the hash value output with a hash value that is published by a file vendor (e.g., such as through display on a file vendor's website). Matching hash values indicate that the given file is indeed authentic, and mismatches between the computed hash value and a published hash value indicate that a file has been tampered with in some way (e.g., by a malicious actor, through errors during download or other transmission between a file vendor and a client device, etc.).

In such arrangements, an attacker who supplants a legitimate file on the distributed file system of a file vendor would subsequently need to inject the hash value of the malicious file in place of the file vendor's legitimate hash value in order for the malicious file to successfully deceive users. An attacker may be able to establish a pattern of accesses to physical storage locations through analyzing network traffic over some period of time, and thus infer the location of a given file's hash value.

In some embodiments, a shuffle index is utilized to obfuscate the physical locations of file digests or other data objects by shuffling the file digests into different physical locations periodically (e.g., upon each data access operation, upon every nth data access operation, upon expiration of a predetermined time period, upon user request to initiate shuffling, upon detection of one or more events, etc.). The shuffle index can be applied to mask the physical storage locations of the file digests in the distributed file system while preserving the logical structure of the file system itself, thus effectively decoupling the storage location of the file digest from its associated file. This makes it a far more challenging task to deduce where a file's associated file digest is stored.

FIG. 1 shows an information processing system 100 including a content provisioning system 102 that implements a shuffle index module 104. The shuffle index module 104 provides for shuffling of file digests (e.g., hash values, checksums, etc.) of files that are stored in a distributed file system 106. The distributed file system 106 in the FIG. 1 embodiment is implemented via a storage area network that includes a number of storage systems 108-1, 108-2, . . . , 108-N (collectively, storage systems 108).

In some embodiments, one or more of the storage systems 108 comprise a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement a storage system in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

As shown in FIG. 1, each of the storage systems 108 includes a corresponding file digest data store 110. The file digest data store 110 implements a data structure that maps between UUIDs and file locations. In some embodiments, the file digest data store 110 is implemented as a DHT, and the UUIDs are hash values for the files stored in the storage system 108.

Client devices 112-1, 112-2, . . . , 112-M (collectively, client devices 112) utilize the content provisioning system 102 to download files from the distributed file system 106 provided by the storage systems 108. The client devices 112, for example, include respective applications 114 that may be configured to upload files and file digests to and download files and file digests from the storage systems 108. The applications 114 of client devices 112 provide file access requests to the content provisioning system 102.

The content provisioning system 102 parses the file access requests to obtain UUIDs of requested files. The content provisioning system 102 utilizes the file digest data store 110 to map the UUIDs of the requested files to the physical storage locations of the requested files in the storage systems 108. The shuffle index module 104 is configured to shuffle or swap the physical locations of file digests or hash values in response to occurrence of various designated conditions. In some embodiments, the designated condition is a file or data access operation, a designated number of file or data access operations, expiration of a predetermined time period, detection of a user request to initiate shuffling from an authorized user, detection of one or more events, etc.

The shuffle index module 104 implements a shuffle index to distribute file digests or file hashes across the file digest data stores 110 of the storage systems 108. In some embodiments, the file digests or file hashes are distributed among the storage systems 108 utilizing a tree structure, where the leaves of the tree structure store the file digests or hash values. The tree structure in some embodiments is a B+-tree structure, such as an unchained B+ tree. The internal nodes and leaves of the tree structure are distributed among the storage systems 108 of the content provisioning system 102. In some embodiments, the internal nodes and leaves are uniformly distributed among the storage systems 108 of content provisioning system 102, although this is not a requirement.

As mentioned above, the tree structure may be an unchained B+ tree, or a B+ tree with no links between leaves. File digests or file hashes are stored in the leaves, with internal nodes and leaves being distributed amongst the storage systems 108 of content provisioning system 102. The particular number of storage systems 108, or portions of the file digest data store 110, may be selected to provide a balance between performance and security. Various embodiments are described below using three data stores (e.g., three instances of file digest data store 110 or a hash index table data store), which provides a good balance between performance and security. It is to be appreciated, however, that embodiments are not limited to shuffling amongst three file digest data stores and that shuffling may be implemented for various other numbers of file digest data stores.

Each of the nodes of the B+ tree has a logical identifier. The logical identifiers are translated at the physical level into a physical location where the data (e.g., a file digest or hash value) is stored in one of the storage systems 108. The tree structure may be evenly distributed across the file digest data stores 110. For a three data store arrangement, for example, each data store may store one third of the nodes in the shuffle index, and approximately one third of the children of each node.

The shuffle index implemented by shuffle index module 104 acts as an intermediary between the users (e.g., client devices 112) and the file digest data stores 110. In some embodiments, for each data access operation the shuffle index module 104 carries out a subsequent shuffle operation which shuffles data into different physical locations on the file digest data stores 110 by reordering the leaf nodes of the shuffle index (e.g., leaf nodes of a B+-tree structure). This shuffling operation may involve many downloads and uploads. As a result, neither the user nor the data stores 110 are able to establish access patterns to learn the physical storage location of a given file digest or hash value.

Figure 3:
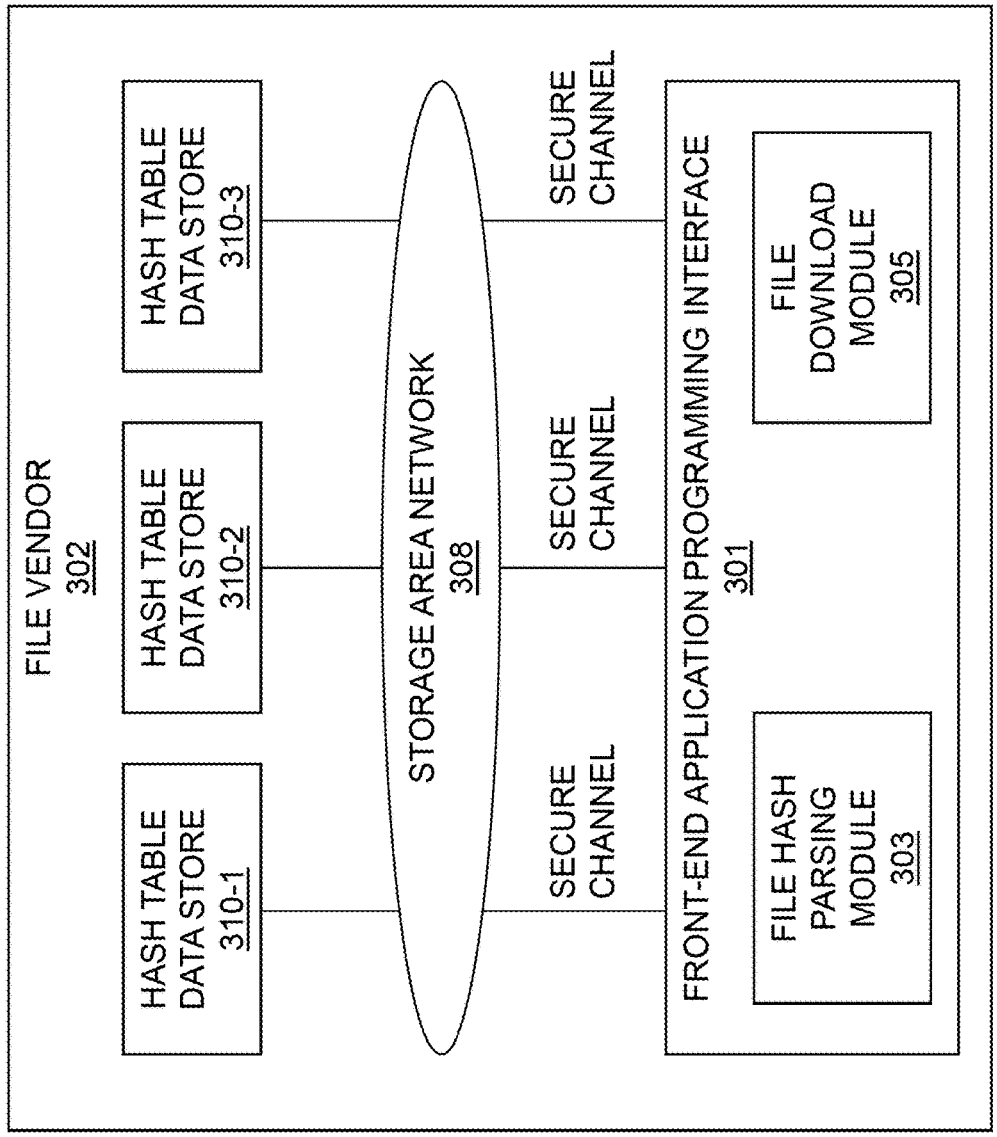
FIG. 3 shows a file vendor with a front-end application programming interface in an illustrative embodiment.
Figure 4:
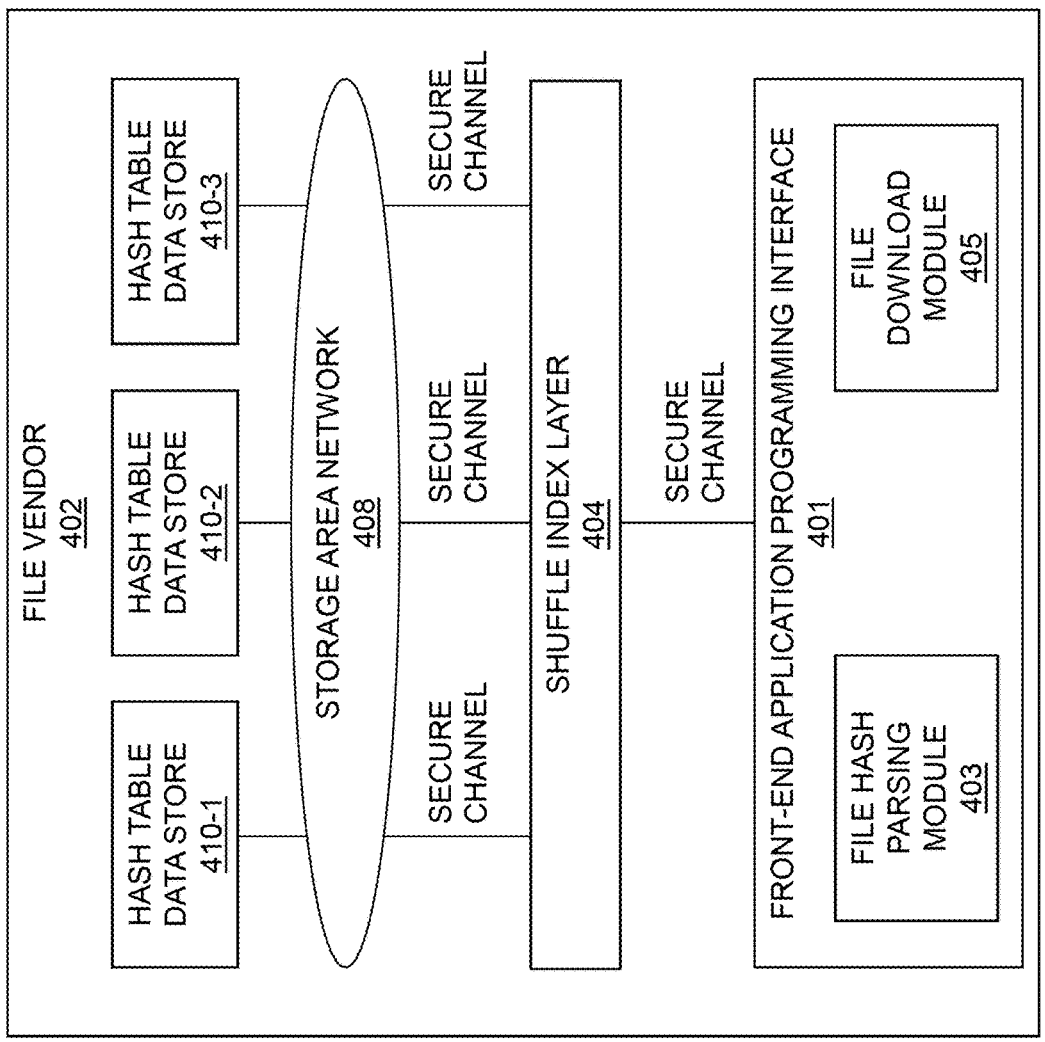
FIG. 4 shows a file vendor with a front-end application programming interface and a shuffle index mechanism in an illustrative embodiment.
Figure 5:
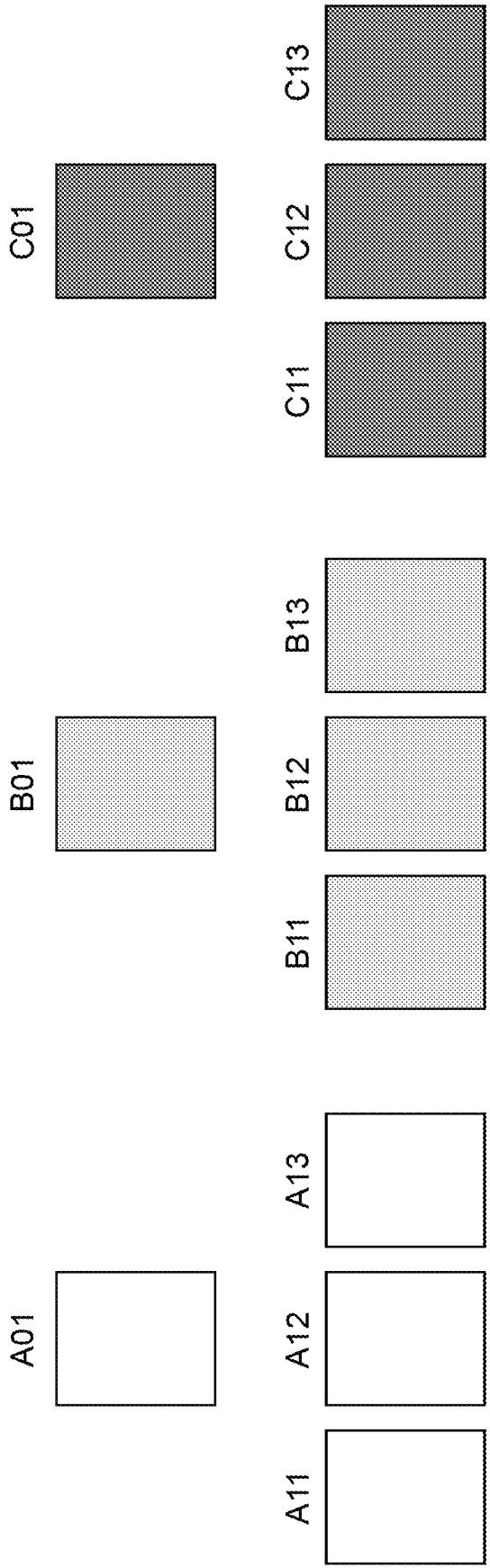
FIG. 5 shows a physical index of a shuffle structure in an illustrative embodiment.
Figure 6:
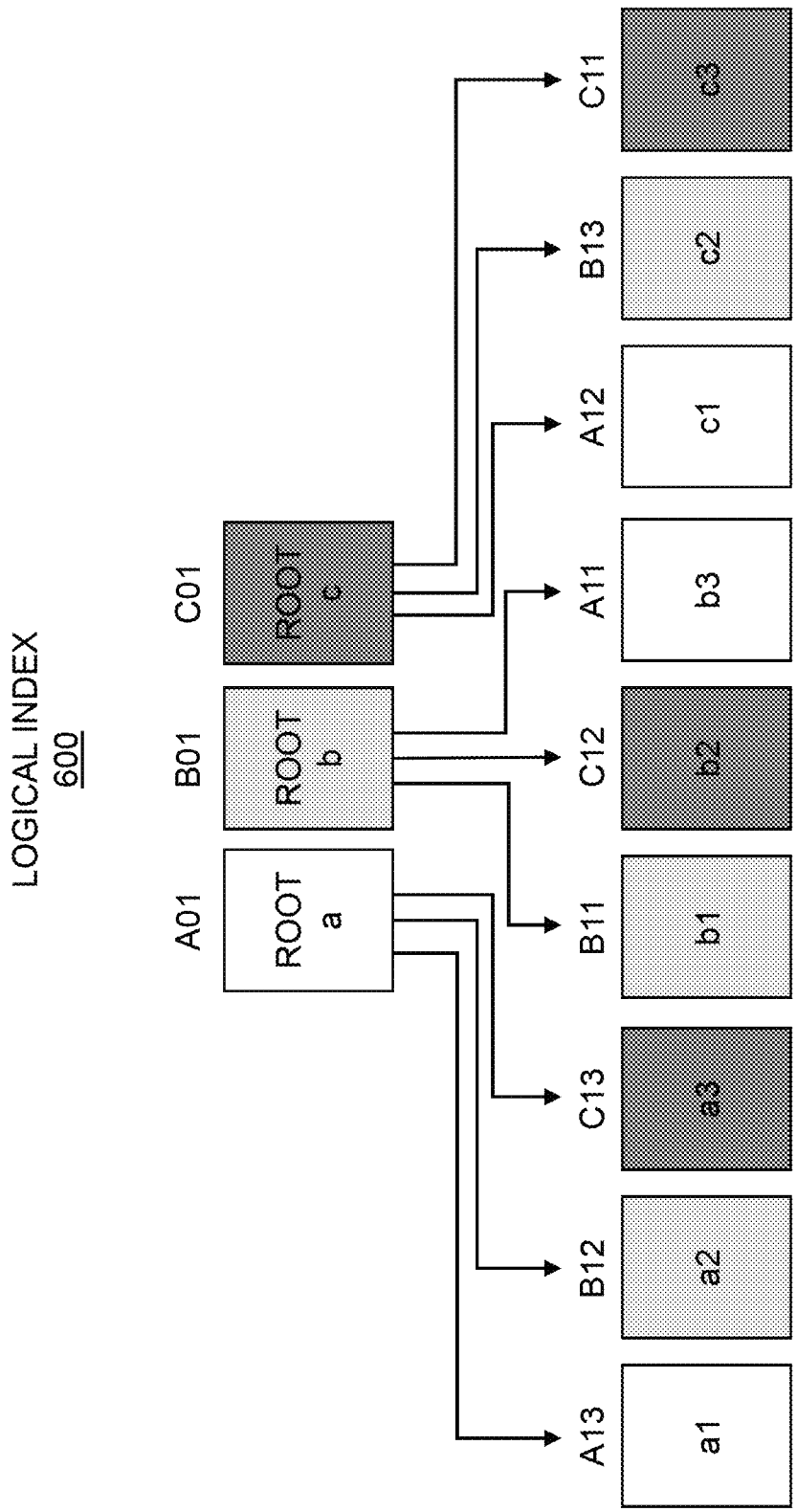
FIG. 6 shows a logical index of a shuffle structure in an illustrative embodiment.
Figure 7:
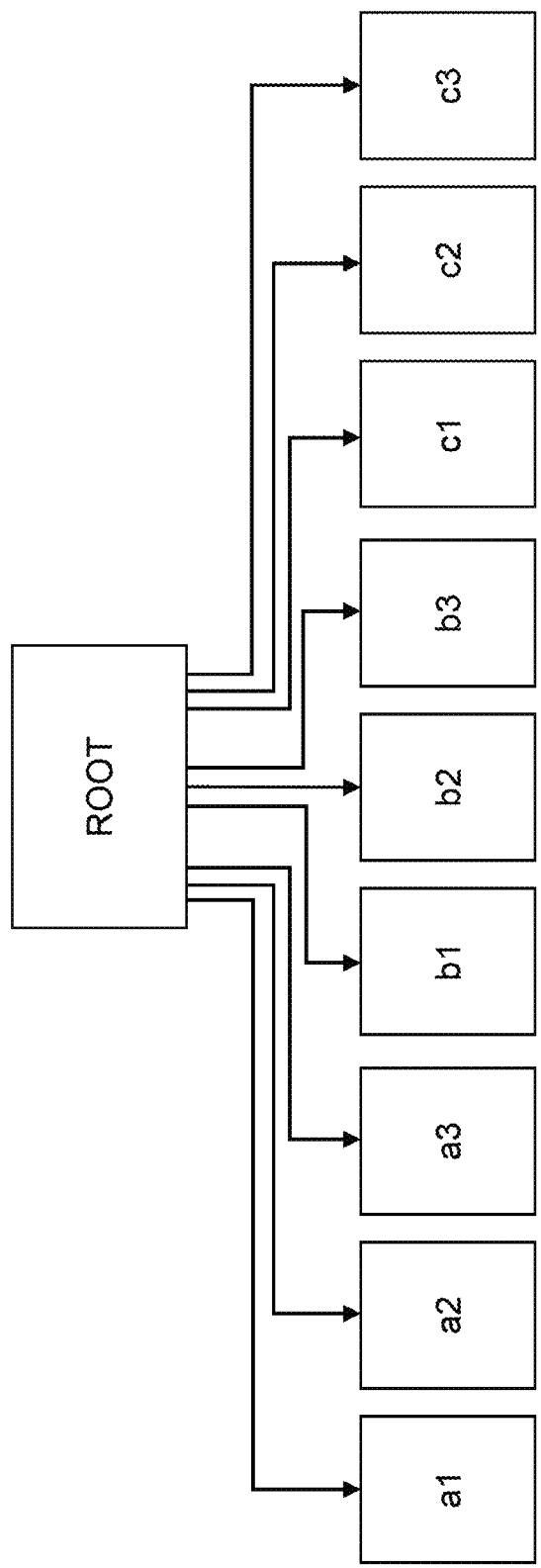
FIG. 7 shows an abstract index of a shuffle structure in an illustrative embodiment.
Figure 8:
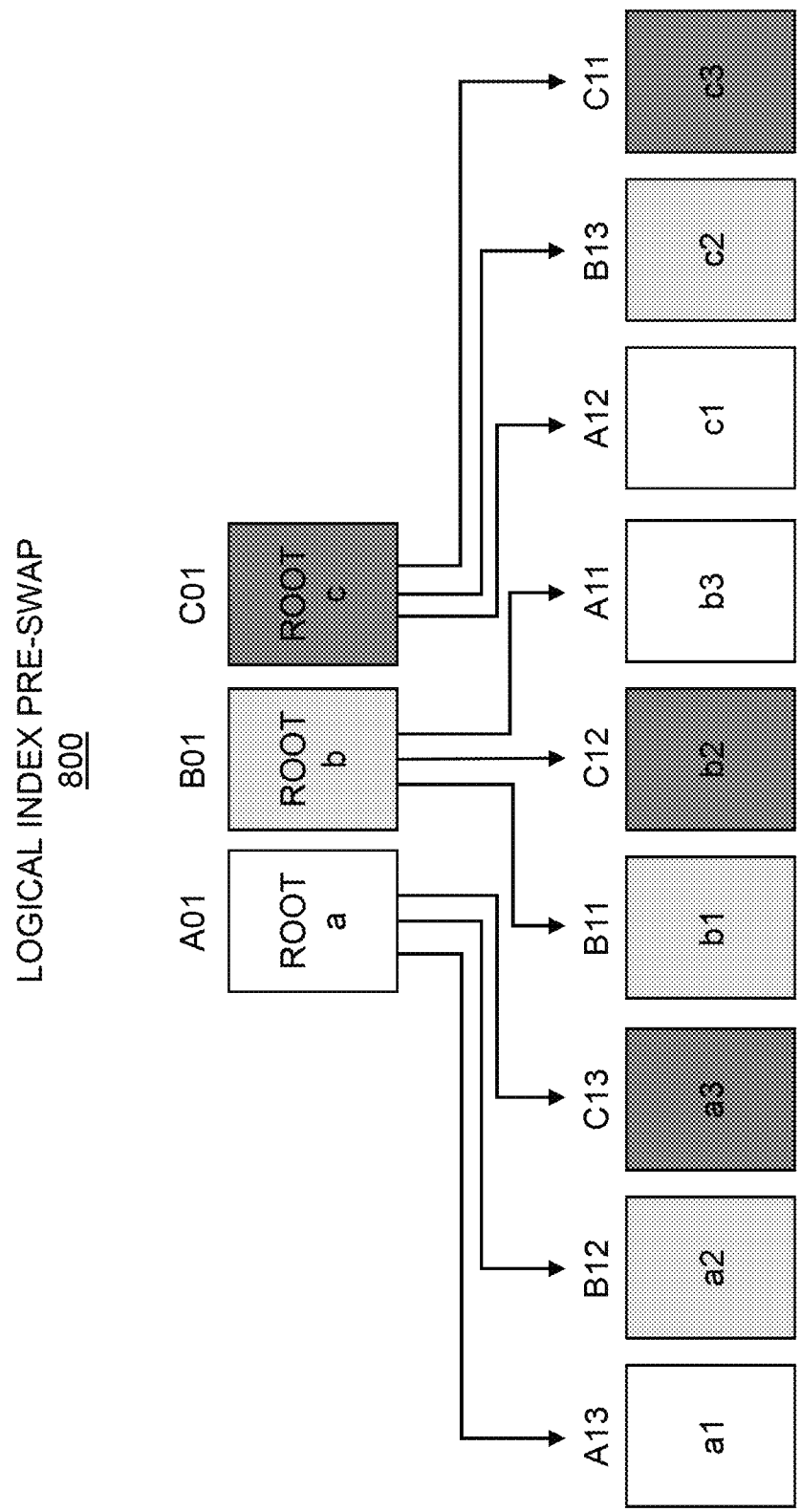
FIG. 8 shows an example of a logical index of a shuffle structure before a swap operation in an illustrative embodiment.
Figure 9:
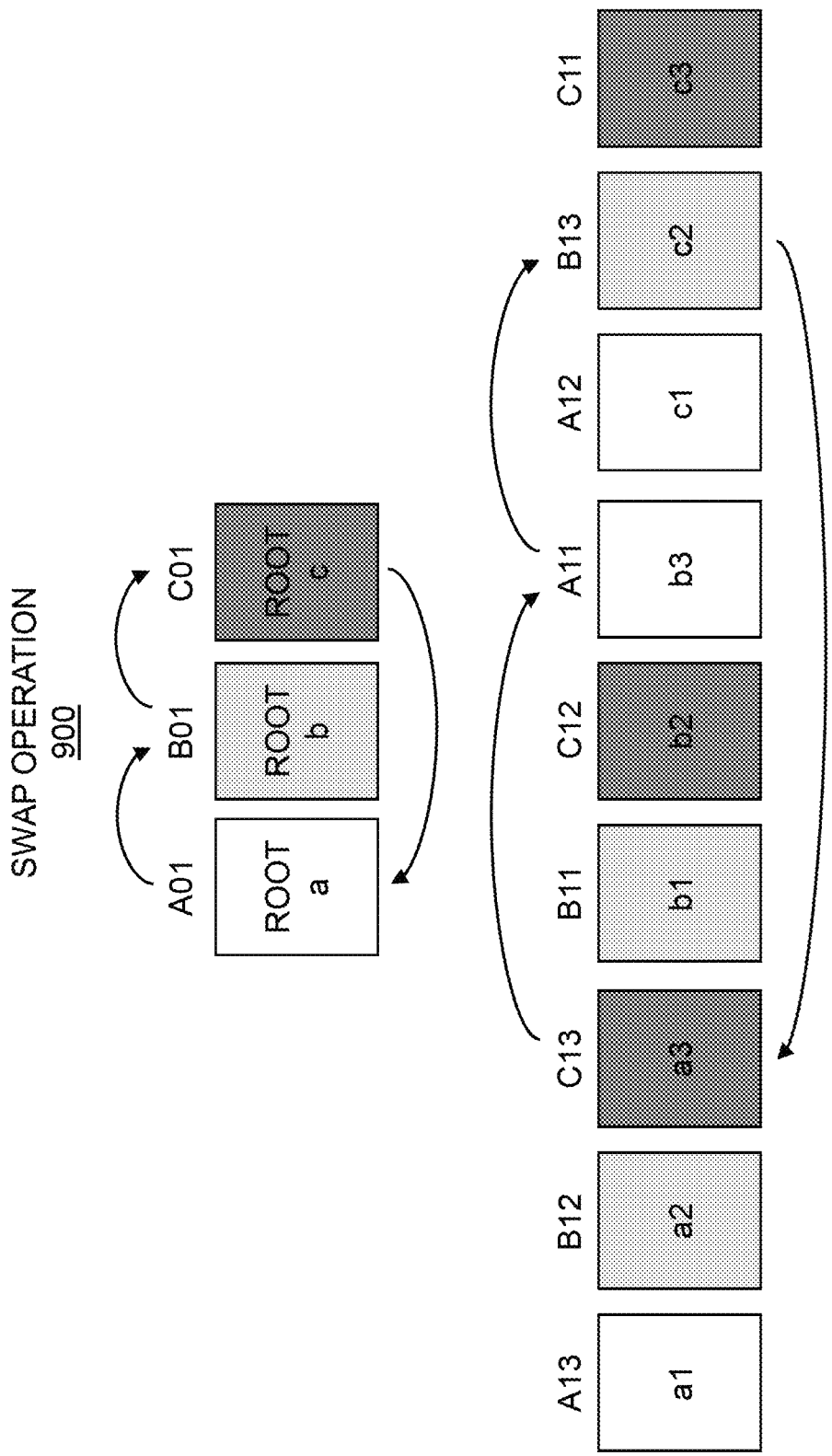
FIG. 9 shows a swap operation for the shuffle structure of FIG. 8 in an illustrative embodiment.
Figure 10:
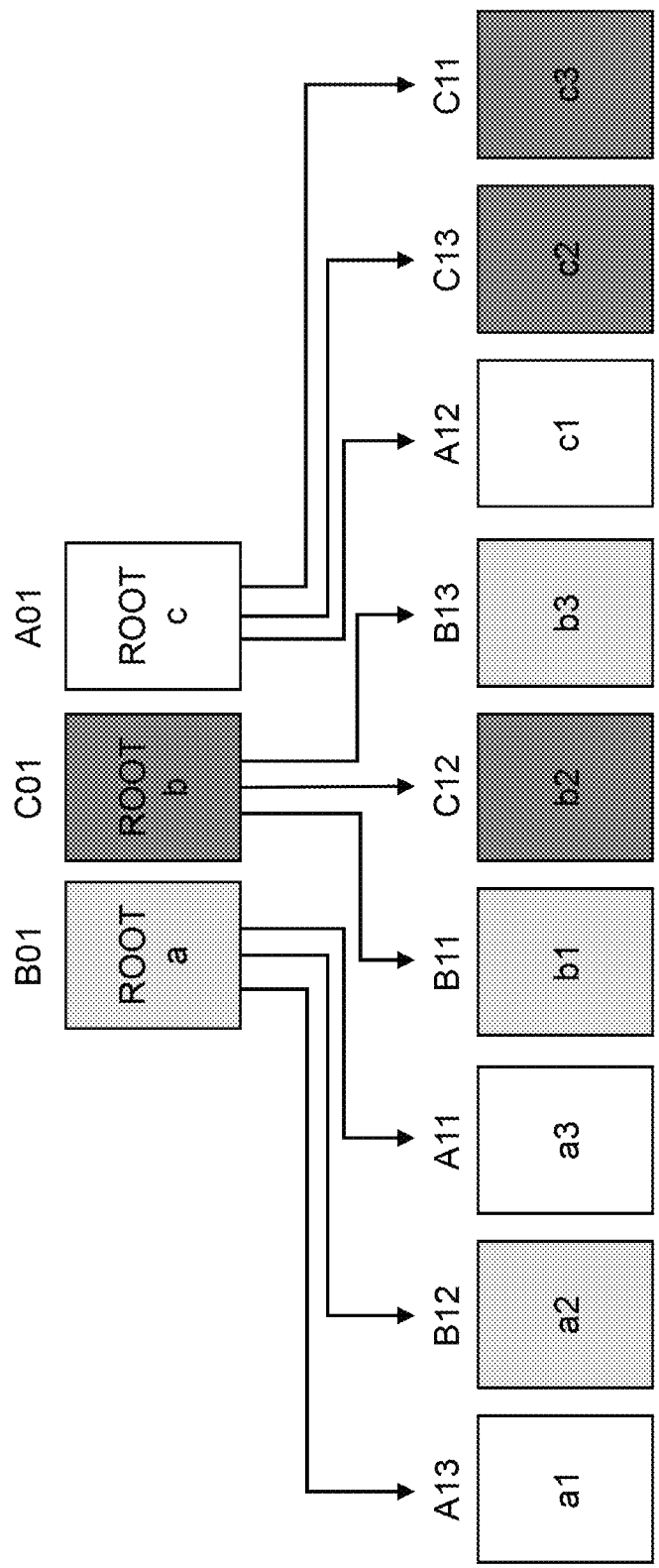
FIG. 10 shows the logical index of the FIG. 8 shuffle structure after the FIG. 9 swap operation in an illustrative embodiment.

As mentioned above, in some embodiments the content provisioning system 102 may implement the file digest store utilizing a DHT architecture. FIGS. 3 and 4, described in further detail below, show examples of file vendors using DHT architectures without and with obfuscation techniques (e.g., without and with use of a shuffle index). FIGS. 5-7 detail the relationships and architecture of an example shuffle index structure. FIGS. 8-10 detail a single swap operation. Many swap operations combined may form a shuffle index operation, which as mentioned above may take place when the shuffle index module 104 detects occurrence of one or more designated conditions (e.g., each data or file access, every nth data or file access, expiration of a predetermined time period, an explicit user request to initiate shuffling, detection of some other designated event, etc.).

In some scenarios, a potential drawback of utilizing a shuffle index occurs where the data in question consists of files of varying sizes. In such scenarios, an attacker can carry out pattern analysis by identifying files and their corresponding physical location by their specific size. Another potential drawback with regards to use of a shuffle index is that the shuffling operation may incur a significant performance overhead if performed on a data set of large files (e.g., audio files, video files, etc.). Some embodiments overcome these potential drawbacks by shuffling file digests or hash values but not shuffling the associated files. In terms of file size, hash values are both small and uniform, meaning that when the shuffle index is applied to them the issues of shuffle operation performance overhead and pattern analysis by file size are avoided.

A hash function takes data of arbitrary size as input and produces a fixed length output—a hash value or message digest. The output of an effective hash function will be collision resistant, which enforces uniqueness. This uniqueness makes hash values ideal for creating a fingerprint of a large data set which can later be used for purposes such as the verification of whether or not the data set has changed, or for testing that two data sets are equal. In the case of distributed hash tables these qualities are also useful for assigning unique and uniformly-sized identifiers for locating files.

Application of the shuffle index in content provisioning system 102 using shuffle index module 104 advantageously obfuscates the physical storage locations of file digests or hash values, thus providing protection to these file digests or hash values and increasing the complexity of executing certain types of attacks on DHT and other systems. The shuffle index, when deployed in a configuration with three data stores, is also resistant to the threat posed by these data stores sharing information with each other. In a DHT architecture, hash values are stored in tables across multiple single-node data stores, thus making the DHT architecture particularly suitable for shuffle index integration.

The content provisioning system 102 may be part of cloud infrastructure such as an Amazon Web Services (AWS) system. Other examples of cloud-based systems that can be used to provide the content provisioning system 102 include Google Cloud Platform (GCP) and Microsoft Azure.

The content provisioning system 102, shuffle index module 104, file digest data stores 110, client devices 112 and other components of the information processing system 100 in the FIG. 1 embodiment are assumed to be implemented using at least one processing platform each comprising one or more processing devices each having a processor coupled to a memory. Such processing devices can illustratively include particular arrangements of compute, storage and network resources.

The content provisioning system 102, components thereof (e.g., shuffle index module 104, file digest data stores 110, etc.), and client devices 112 may be implemented on respective distinct processing platforms, although numerous other arrangements are possible. For example, in some embodiments at least portions of the content provisioning system 102 and one or more of the client devices 112 are implemented on the same processing platform. A given client device (e.g., 112-1) can therefore be implemented at least in part within at least one processing platform that implements at least a portion of the content provisioning system 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the content provisioning system 102, client devices 112 or portions or components thereof, to reside in different data centers. Numerous other distributed implementations are possible. The content provisioning system 102 can also be implemented in a distributed manner across multiple data centers.

Additional examples of processing platforms utilized to implement content provisioning systems in illustrative embodiments will be described in more detail below in conjunction with FIGS. 11 and 12.

It is to be appreciated that these and other features of illustrative embodiments are presented by way of example only, and should not be construed as limiting in any way.

Accordingly, different numbers, types and arrangements of system components such as content provisioning system 102, storage systems 108, file digest data stores 110, etc. can be used in other embodiments. Although FIG. 1 shows an arrangement wherein there is only a single content provisioning system 102, in other embodiments there may be multiple content provisioning systems, possibly running on different physical infrastructure, which are part of distinct data centers, cloud computing environments, etc. Each content provisioning system 102 may implement its own shuffle index module 104, or one shuffle index module 104 may be shared amongst multiple content provisioning systems. It is also possible for the shuffle index module 104 to implement multiple shuffle indexes for content provisioning system 102, or for content provisioning system 102 to include multiple instances of the shuffle index module 104 to implement distinct shuffle indexes for different distributed file systems or different portions of a same distributed file system.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. Additional examples of systems implementing shuffle index functionality for obfuscating physical storage locations of file digests or hash values will be described below.

At least portions of the content provisioning system 102, shuffle index module 104, file digest data store 110, applications 114, etc. may be implemented at least in part in the form of software that is stored in memory and executed by a processor.

Figure 2:
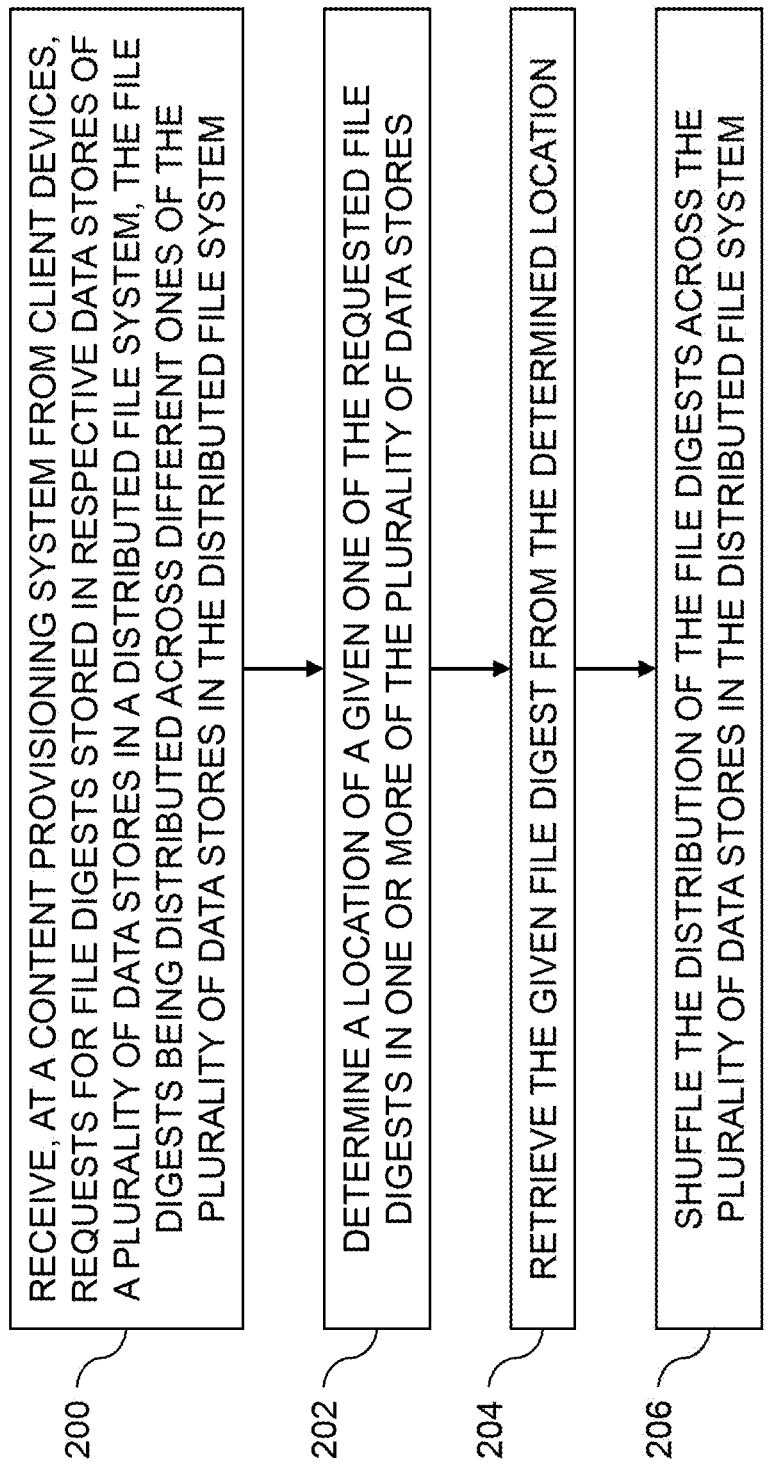
FIG. 2 is a flow diagram of an exemplary process for content provisioning with obfuscation of physical storage locations of file digests using a shuffle index in an illustrative embodiment.

An exemplary process for content provisioning with obfuscation of the physical storage locations of file digests will now be described in more detail with reference to the flow diagram of FIG. 2. It is to be understood that this particular process is only an example, and that additional or alternative processes for content provisioning with obfuscation of the physical storage locations of file digests can be carried out in other embodiments.

In this embodiment, the process includes steps 200 through 206. These steps are assumed to be performed by the shuffle index module 104 of the content provisioning system 102. The process begins with step 200, receiving, at the content provisioning system 102 from one or more client devices 112, one or more requests for file digests stored in respective data stores (e.g., file digest data stores 110) of a plurality of data stores in distributed file system 106. The file digests are distributed across different ones of the data stores 110 in the distributed file system 106. In some embodiments, the file digests comprise hash values of respective files stored in the distributed file system 106. The hash values may provide unique and uniformly-sized identifiers for locating files stored in the distributed file system 106.

The file digests in some embodiments are distributed across the data stores 110 in the distributed filed system 106 utilizing a tree structure, where the file digests are stored in leaves of the tree structure. Each leaf node, for example, may contain a single file digest (e.g., a single hash value). A root node of the tree structure is a superset housing these leaf nodes. The root node itself, however, does not have a file digest attached. The tree structure is hierarchical, and the root node contains a set of leaf nodes. The tree structure may include a B+ tree structure. Internal nodes and the leaves of the tree structure are distributed among the data stores 110 of the distributed file system 106. Each node in the tree structure may include a logical identifier that has a first portion identifying a given one of the data stores 110, a second portion identifying a level of the tree structure, and a third portion indicating a physical storage location in the given data store. The tree structure may include two or more levels, and the shuffling of step 206 described below may include shuffling at least a portion of the nodes in each of the two or more levels of the tree structure. In some embodiments, this shuffling is implemented as a set of swap operations moving file digests between the nodes of the tree structure.

The process continues with step 202, determining a location of a given one of the requested file digests in one or more of the plurality of data stores 110. In step 204, the given file digest is retrieved from the location determined in step 202. The given file digest may then be provided to the requesting client device. The retrieved file digest may also or alternatively be used to retrieve an associated file that is provided to the requesting client device.

In step 206, the distribution of the file digests across the plurality of data stores 110 in the distributed file system 106 is shuffled. The shuffling in step 206 may occur, in some embodiments, responsive to each of the requests received at the content provisioning system 102 in step 200. The shuffling of step 206 may include re-distributing at least a portion of the file digests pseudo-randomly across the plurality of data stores 110 in the distributed file system 106. In some embodiments, the plurality of data stores 110 are implemented on a plurality of cloud storage nodes. The plurality of data stores 110 in some embodiments provide a DHT architecture. The plurality of data stores 110 may include at least three data stores, so as to obviate potential collusion among the data stores.

FIGS. 3 and 4 illustrate respective file vendors 302 and 402, which implement respective DHT architectures. The file vendor 302 of FIG. 3 does not provide obfuscation capability, while the file vendor 402 of FIG. 4 does so via a shuffle index layer 404. The file vendors 302, 402 each include respective front-end APIs 301, 401 with respective file hash parsing modules 303, 403 and file download modules 305, 405. The file hash parsing modules 303, 403 are configured to receive data access or file access requests from client devices or applications running thereon (not shown in FIGS. 3 and 4), and to parse such data access or file access requests to determine UUIDs of requested data or files. Such UUIDs are illustratively in the form of hash values of the requested data or files. The file download modules 305, 405 utilize the UUIDs determined by the file hash parsing modules 303, 403 to obtain the requested data or files from hash table data stores 310, 410 implemented as part of a distributed file system provided over secure channels via SANs 308, 408. In each file vendor 302, 402, the hash table data stores 310, 410 are spread across three nodes (e.g., hash table data stores 310-1, 310-2 and 310-3 for file vendor 302, hash table data stores 410-1, 410-2 and 410-3 for file vendor 402). It should be appreciated, however, that this is not a requirement and that in other embodiments different numbers of nodes may provide the hash table data stores or more generally file digest data stores.

File vendor 302, as mentioned above, does not provide functionality for obscuring the physical storage locations of the file hash values. Thus, the file vendor 302 is susceptible to the various drawbacks noted above and elsewhere herein. File vendor 402, however, includes the shuffle index layer 404, which provides functionality similar to that described above with respect to shuffle index module 104 of content provisioning system 102. The shuffle index layer 404 of file vendor 402 maintains a shuffle index, which is a logical index of pointers to the data which is, in the FIG. 4 example, hash values. FIGS. 5-7 illustrate the relationships and architecture of the physical, logical and abstract shuffle index which may be implemented by shuffle index layer 404. FIG. 5 shows the physical index 500 of the shuffle index structure. In this example, there are three physical nodes denoted A, B and C providing the DHT architecture. As illustrated, the DHT architecture is split evenly across the three physical nodes at a first level or root level (denoted by nodes A01, B01 and C01) and via leaf nodes at a second level denoted A11, A12, A13 for physical node A, B11, B12, B13 for physical node B, and C11, C12 and C13 for physical node C. The identifiers for the nodes in the tree structure include the letter denoting the physical node or data store, a first number denoting a level of the tree structure, and a second number denoting a location within the physical node or data store.

FIG. 6 shows the logical index 600 of the shuffle index structure. The logical index 600 illustrates what the user or shuffle index layer 404 sees, which in this case includes root a, root b and root c on the physical nodes A01, B01 and C01. Root a, root b and root c denote supersets housing respective sets of leaf nodes. The leaf nodes store respective file digests or file hash values. The structure is hierarchical, and the root nodes a, b and c contain respective sets of leaf nodes. This is illustrated by the logical index 600 of FIG. 6. The file hash values a1, a2 and a3 contained in "root a" are stored in leaf nodes A13, B12 and C13, respectively, on the different physical nodes denoted A, B and C. The file hash values b1, b2 and b3 contained in "root b" are stored in leaf nodes B11, C12 and A11, respectively, on the different physical nodes B, C and A. The file hash values c1, c2 and c3 contained in "root c" are stored in leaf nodes A12, B13 and C11, respectively, on the different physical nodes A, B and C. The shuffle index, as illustrated, stores different hash values on the different physical nodes A, B and C. The physical storage locations are shuffled over time via swap operations, an example of which will be described in further detail below with respect to FIGS. 8-10.

FIG. 7 shows the abstract index 700 of the shuffle index. The abstract index 700 shows a simplified view of the tree structure, showing one root node and the leaf nodes storing the hash values a1, a2, a3, b1, b2, b3, c1, c2 and c3.

FIG. 8 shows a logical index 800 before a swap operation. In this case, the logical index 800 is the same as that of FIG. 6 described above. FIG. 9 shows the swap operation 900. The swap operation, as shown, is done at each level of the tree hierarchy. At the first level, root a is moved from node A01 to node B01, root b is moved from node B01 to node C01, and root c is moved from node C01 to node A01. At the second level, file hash value a3 is moved from node C13 to node A11, file hash value b3 is moved from node A11 to node B13, and file hash value c2 is moved from node B13 to node C13. FIG. 10 shows the logical index 1000 after the swap operation 900, where the root values a, b and c are now on nodes B01, C01 and A01, respectively, and the file hash values a3, b3 and c2 are now on nodes A11, B13 and C13, respectively.

FIGS. 8-10 illustrate one swap operation. It should be appreciated that a shuffle operation may include many swap operations combined. The shuffle operation may take place on detecting various designated conditions. In some embodiments, the shuffle operation takes place after each data or file access operation. In other embodiments, the shuffle operation may take place after every nth data or file access operation, where n is greater than 1. In still other embodiments, the shuffle operation may take place after expiration of a designated time period (e.g., a shuffle operation may be performed periodically such as every minute, every hour, every day, etc.), in response to an explicit shuffle request (e.g., from an authorized user), or in response to detection of some designated condition (e.g., a potential tampering event, detection of a security threat, etc.).

Advantageously, illustrative embodiments overcome various disadvantages associated with other techniques for providing access pattern confidentiality. For example, some protocols enable the retrieval of data from a data store while masking which specific data that is accessed during retrieval. In a multiple data store scenario, such as a distributed file system, such protocols work off the assumption that there is no collusion between the various data stores. If there is collusion between data stores, however, the only way to ensure access pattern confidentiality is for a data store to send the entire contents of its database to a requesting user thus rendering it impossible for the file vendor or a network snooper to tell which exact data object or objects the user is accessing. Such an approach, however, is of course highly resource intensive and thus not generally desirable.

It is possible to adjust the above-described protocol such that a user splits a query into subqueries, and then splices the set of subqueries with arbitrary subqueries of other users for the purposes of obfuscation. The spliced sets of subqueries are then anonymously sent to the data store, whose response is uniformly sent to all users. Users then filter out irrelevant queries from the batch responses. An attacker snooping on the network is, as such, unable to determine which subqueries and responses are associated with each user. Such an approach, however, relies on the noise generated by multiple users supplying multiple subqueries and is thus not effective in a one-user context, as the data store could safely assume that the supplied subqueries are all from that user. This is relevant in regards to a data vendor system, as the "user" in this case could simply be a system component that periodically verifies hash values against a data store. Such a system would likely be unable to generate sufficient noise to obscure access patterns.

Other protocols may transfer a data set in parts, with the sender of the set being oblivious as to whether or not a part has been sent or which part has been sent. The data set itself consists of the data that the user has requested as well as redundant data being sent for the purposes of obfuscating what data the user is accessing. The sender receives no confirmation of packet receipt from the receiver side. Redundant packets are filtered out by a system component known as a chooser. Such an approach, however, does not offer guarantees of privacy in the event of a malicious chooser. As described above, an attacker may seek to inject malicious software into a file vendor's system, and the attacker would thus target the chooser component. While the shuffle index component described herein may also be a target for an attacker, the shuffle index provides improved security relative to a chooser component. Unlike the shuffle index, the chooser component obfuscates the data being sent but does not modify the physical storage locations of accessed data and as such traffic analysis could be employed to correlate physical storage locations with logical operations in order to infer the location of data being accessed.

Another approach for providing access pattern confidentiality is referred to as oblivious RAM or ORAM. ORAM may, in effect, provide a role similar to that of a shuffle index but with various shortcomings relative to use of a shuffle index as described herein. For example, ORAM does not mitigate the threat posed by collusion between data providers. To the contrary, ORAM is dependent on there being no collusion between the data stores or data providers. The shuffle index described herein, in contrast, mitigates the threat posed by collusion, such as when deployed in a configuration with three data stores.

In some embodiments, the shuffle index described herein is implemented within Lockbox, an encrypted storage utility for sensitive application data (e.g., passwords, hashes, etc.) available from Dell EMC. In Lockbox, files are under two kilobytes (16,000 bits), and the Lockbox includes no more than one thousand such files in total. The size of hash values or file digests may typically range from 128 to 512 bits, though some longer hash values (e.g., RSA Randomart) may be in the range of 2048 to 4096 bits, which all conform to the above-described restrictions of Lockbox. Lockbox may be accessed via an API, and thus the shuffle index layer 404 or shuffle index module 104 described herein may be deployed as middleware between a user application and a Lockbox storing application hash values. In some embodiments, it is desired to implement multiple Lockbox configurations (e.g., three or more) to combat possible collusion as described elsewhere herein. The shuffle index layer 404 or shuffle index module 104 may also be deployed as a module within a suitable modified Lockbox application. The shuffle index layer 404 or shuffle index module 104 may be provided as an add-on to the Lockbox software, or as a separate component compatible for use with the Lockbox software.

In other embodiments, the shuffle index described herein is implemented within cloud storage products such as ECS available from Dell EMC. For example, the shuffle index may be implemented on Dell EMC ECS nodes. The shuffle index may be deployed in the form of software code installed on one or more machines (e.g., containers, VMs, physical machines, etc.) with connectivity to the ECS data stores. The ECS data stores may be implemented via software-only configurations installed on separate machines. The shuffle index implementation includes resource scripts into which relevant information of each data store, such as an Internet Protocol (IP) address, username, data object name, etc., is placed. Techniques may also be used to protect the shuffle index from attack, such as various machine hardening and security techniques.

The shuffle index in the above-described implementation may be deployed as an application on a physical or virtual machine, a container, etc. The shuffle index, like any other application running on an operating system, may be targeted and thus similar steps to those taken when securing any critical resource may be applied to protect the shuffle index from attack. The complexity of implementing security for a shuffle index may be dependent on whether the shuffle index is deployed into an existing secure system or product.

Some embodiments may combine the above-described approaches, such as in a scenario where the data stores on the ECS nodes run Dell EMC Lockbox, which as mentioned above is an encrypted store used for securing sensitive data (e.g., the file digests or hash values in this context). The addition of Lockbox to the data store components of ECS nodes bolsters security further, and in the event that an attacker is able to infer the location of a particular file digest or hash value, Lockbox presents another obstacle which must be breached in order for the attacker to interfere with the file digest or hash value. It is also possible, in some embodiments, to leverage secure software such as Dell EMC Lockbox on the shuffle index itself, so as to secure the index of storage location pointers. It should be noted that the introduction of one or more instances of secure software such as Dell EMC Lockbox will incur performance overheads, such as due to encryption and decryption operations performed by such software. The tradeoff between performance and additional security may be tailored as desired for a particular implementation.

In some embodiments, cloud service providers may utilize file digests or hash values in order to provide guarantees of data integrity. The shuffle index described herein may be utilized to provide an additional layer of protection to such integrity mechanisms in the cloud service providers. The cloud service providers may also or alternatively offer the additional layer of protection provided by the shuffle index as part of an add-on service for certain users (e.g., possibly in conjunction with a tiered payment scheme). The shuffle index may thus be packaged as a product to such users, or the shuffle index may provide its functionality as a service offered to such users.

Content providers that allow users to download files may directly integrate the shuffle index into an existing system that uses hash or digest-based file integrity verification. Examples of such systems include systems which utilizes the DHT architecture, such as content distribution and person-to-person (P2P) file sharing systems. Music and video streaming providers, application stores and other digital content stores from which users purchase and download files are other systems which may benefit from use of the shuffle index described herein. It should be appreciated that the above-described use cases are presented by way of illustrative example only, and that embodiments are not limited to these particular use cases.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for content provisioning with obfuscation of physical storage locations of file digests will now be described in greater detail with reference to FIGS. 11 and 12. Although described in the context of system 100, these platforms may also be used to implement at least portions of other information processing systems in other embodiments.

Figure 11:
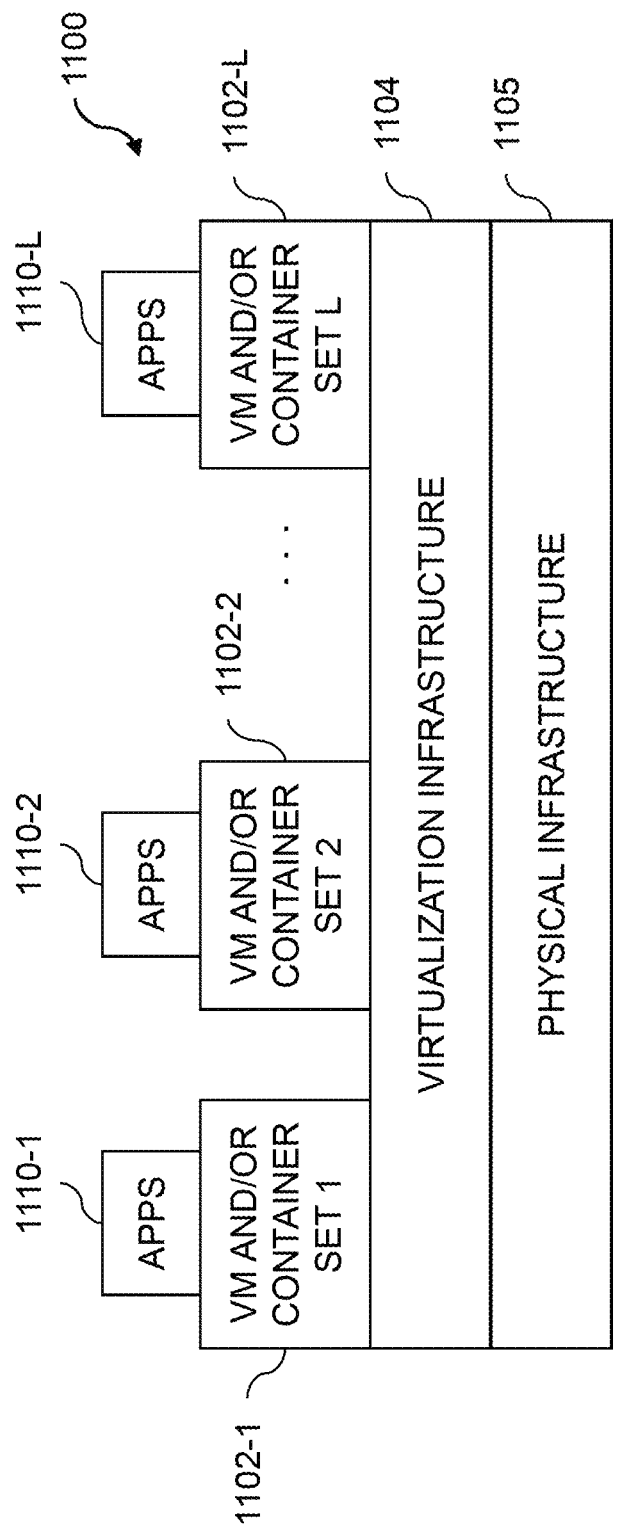
FIGS. 11 and 12 show examples of processing platforms that may be utilized to implement at least a portion of an information processing system in illustrative embodiments.
Figure 12:
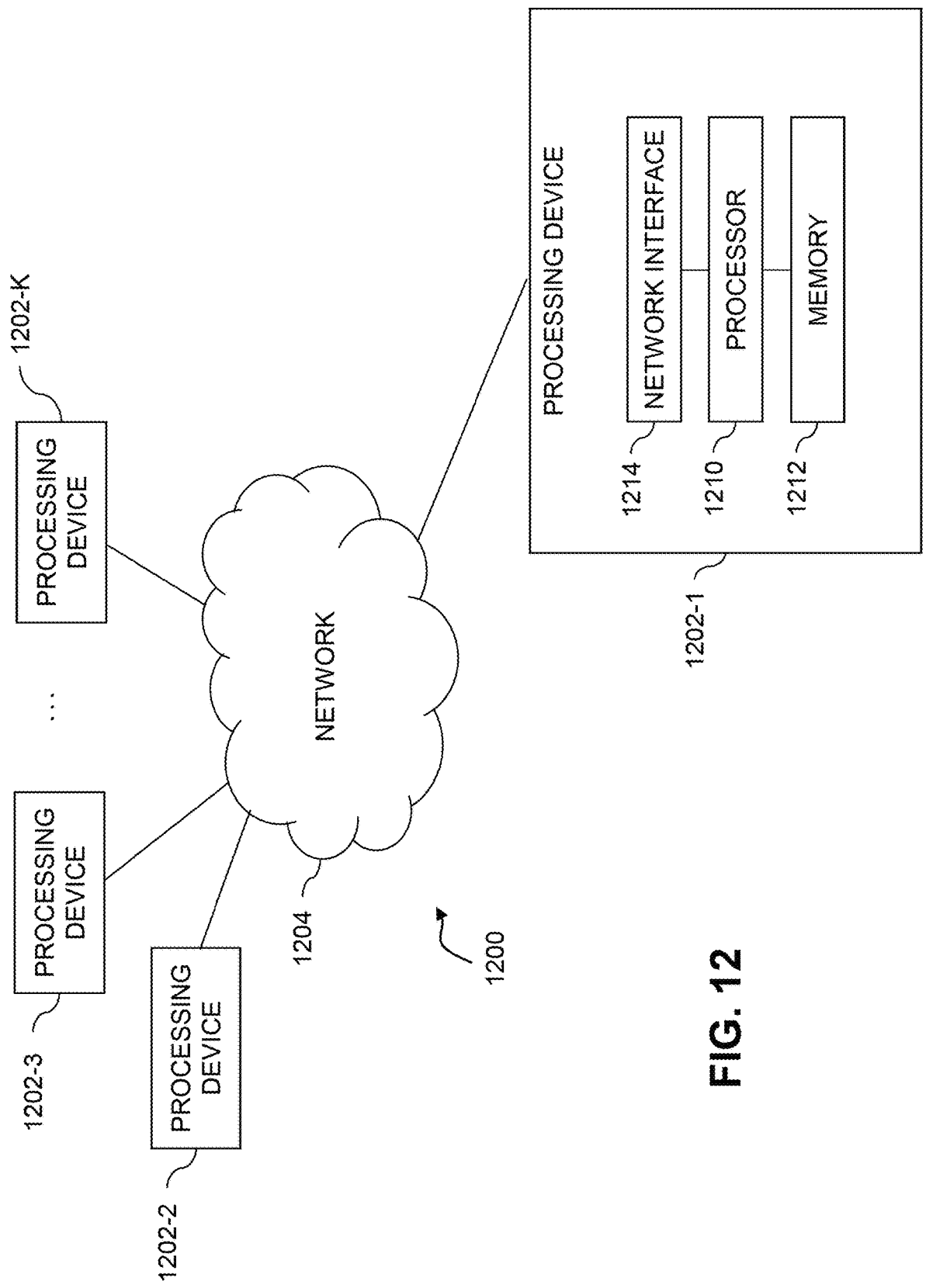

FIG. 11 shows an example processing platform comprising cloud infrastructure 1100. The cloud infrastructure 1100 comprises a combination of physical and virtual processing resources that may be utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. An example of a hypervisor platform that may be used to implement a hypervisor within the virtualization infrastructure 1104 is the VMware® vSphere® which may have an associated virtual infrastructure management system such as the VMware® vCenter™. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the adaptive threshold generation functionality as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, content provisioning systems, file vendors, storage systems, data stores, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   receiving, at a content provisioning system from one or more client devices, one or more requests for file digests stored in respective data stores of a plurality of data stores in a distributed file system, the file digests being distributed across different ones of the plurality of data stores in the distributed file system, each file digest of the file digests being associated with a corresponding file stored in the distributed file system, wherein the file digests comprise hash values of respective files stored in the distributed file system, and wherein the hash values provide identifiers for locating the respective files stored in the distributed file system;
   determining, by at least one processing device comprising a processor coupled to a memory, a physical storage location of a given file digest of the requested file digests in a first data store of the plurality of data stores;
   retrieving, by the at least one processing device, the given file digest from the determined physical storage location in the first data store; and
   shuffling, by the at least one processing device, the distribution of the file digests across the plurality of data stores in the distributed file system, wherein the shuffling the distribution of the file digests across the plurality of data stores comprises:
      moving, by the at least one processing device, the given file digest from the determined physical storage location in the first data store to a new physical storage location in a second data store of the plurality of data stores and maintaining a given file associated with the given file digest in the given file's current physical storage location in the distributed file system; and
      moving, by the at least one processing device, at least one additional file digest not associated with any of the one or more requests for file digests from a previous physical storage location in a third data store of the plurality of data stores to a new physical storage location on one of the first and second data stores and maintaining at least one additional file associated with the at least one additional file digest in the at least one additional file's current physical storage location in the distributed file system;
   wherein the shuffling the distribution of the file digests across the plurality of data stores further comprises utilizing a set of swap operations that moves at least a subset of the file digests between two or more of a plurality of nodes in at least one of two or more levels of a tree structure comprising the plurality of nodes.

2. The method of claim 1 wherein the hash values provide unique and uniformly-sized identifiers for locating files stored in the distributed file system.

3. The method of claim 1 wherein the file digests are distributed across the plurality of data stores in the distributed file system by utilizing the tree structure, and wherein the file digests are stored in leaves of the tree structure.

4. The method of claim 3 wherein the tree structure comprises a set of leaf nodes without links between the leaf nodes.

5. The method of claim 3 wherein internal nodes and the leaves of the tree structure are distributed among the data stores in the distributed file system.

6. The method of claim 1 wherein a given node of the tree structure comprises a logical identifier, the logical identifier comprising:
   a first portion identifying a given one of the plurality of data stores;
   a second portion identifying a level of the tree structure; and
   a third portion indicating a physical storage location in the given data store.

7. The method of claim 1 wherein shuffling the distribution of the file digests across the plurality of data stores is performed responsive to each request of the one or more requests received at the content provisioning system.

8. The method of claim 1 wherein shuffling the distribution of the file digests across the plurality of data stores comprises re-distributing physical storage locations of at least a portion of the file digests pseudo-randomly across the plurality of data stores in the distributed file system.

9. The method of claim 1 wherein the plurality of data stores are implemented on a plurality of cloud storage nodes.

10. The method of claim 1 wherein the plurality of data stores provide a distributed hash table architecture.

11. The method of claim 1 wherein the plurality of data stores comprises at least three data stores.

12. A computer program product comprising a non-transitory processor-readable storage medium having stored therein program code of one or more software programs, wherein the program code when executed by at least one processing device causes the at least one processing device:
   to receive, at a content provisioning system from one or more client devices, one or more requests for file digests stored in respective data stores of a plurality of data stores in a distributed file system, the file digests being distributed across different ones of the plurality of data stores in the distributed file system, each file digest of the file digests being associated with a corresponding file stored in the distributed file system, wherein the file digests comprise hash values of respective files stored in the distributed file system, and wherein the hash values provide identifiers for locating the respective files stored in the distributed file system;
   to determine a physical storage location of a given file digest of the requested file digests in a first data store of the plurality of data stores;
   to retrieve the given file digest from the determined physical storage location in the first data store; and
   to shuffle the distribution of the file digests across the plurality of data stores in the distributed file system, wherein the shuffling the distribution of the file digests across the plurality of data stores comprises:
      moving the given file digest from the determined physical storage location in the first data store to a new physical storage location in a second data store of the plurality of data stores and maintaining a given file associated with the given file digest in the given file's current physical storage location in the distributed file system; and
      moving at least one additional file digest not associated with any of the one or more requests for file digests from a previous physical storage location in a third data store of the plurality of data stores to a new physical storage location on one of the first and second data stores and maintaining at least one additional file associated with the at least one additional file digest in the at least one additional file's current physical storage location in the distributed file system; and
   wherein the shuffling the distribution of the file digests across the plurality of data stores further comprises utilizing a set of swap operations that moves at least a subset of the file digests between two or more of a plurality of nodes in at least one of two or more levels of a tree structure comprising the plurality of nodes.

13. The computer program product of claim 12 wherein the hash values provide unique and uniformly-sized identifiers for locating files stored in the distributed file system.

14. The computer program product of claim 12 wherein the file digests are distributed across the plurality of data stores in the distributed file system by utilizing the tree structure, and wherein the file digests are stored in leaves of the tree structure.

15. An apparatus comprising:
at least one processing device comprising a processor coupled to a memory;
the at least one processing device being configured:
to receive, at a content provisioning system from one or more client devices, one or more requests for file digests stored in respective data stores of a plurality of data stores in a distributed file system, the file digests being distributed across different ones of the plurality of data stores in the distributed file system, each file digest of the file digests being associated with a corresponding file stored in the distributed file system, wherein the file digests comprise hash values of respective files stored in the distributed file system, and wherein the hash values provide identifiers for locating the respective files stored in the distributed file system;
to determine a physical storage location of a given file digest of the requested file digests in a first data store of the plurality of data stores;
to retrieve the given file digest from the determined physical storage location in the first data store; and
to shuffle the distribution of the file digests across the plurality of data stores in the distributed file system, wherein the shuffling the distribution of the file digests across the plurality of data stores comprises:
moving the given file digest from the determined physical storage location in the first data store to a new physical storage location in a second data store of the plurality of data stores and maintaining a given file associated with the given file digest in the given file's current physical storage location in the distributed file system; and
moving at least one additional file digest not associated with any of the one or more requests for file digests from a previous physical storage location in a third data store of the plurality of data stores to a new physical storage location on one of the first and second data stores and maintaining at least one additional file associated with the at least one additional file digest in the at least one additional file's current physical storage location in the distributed file system; and
wherein the shuffling the distribution of the file digests across the plurality of data stores further comprises utilizing a set of swap operations that moves at least a subset of the file digests between two or more of a plurality of nodes in at least one of two or more levels of a tree structure comprising the plurality of nodes.

16. The apparatus of claim 15 wherein the hash values provide unique and uniformly-sized identifiers for locating files stored in the distributed file system.

17. The apparatus of claim 15 wherein the file digests are distributed across the plurality of data stores in the distributed file system by utilizing the tree structure, and wherein the file digests are stored in leaves of the tree structure.

18. The apparatus of claim 15 wherein a given node of the tree structure comprises a logical identifier, the logical identifier comprising:
a first portion identifying a given one of the plurality of data stores;
a second portion identifying a level of the tree structure; and
a third portion indicating a physical storage location in the given data store.

19. The apparatus of claim 15 wherein shuffling the distribution of the file digests across the plurality of data stores is performed responsive to each request of the one or more requests received at the content provisioning system.

20. The apparatus of claim 15 wherein shuffling the distribution of the file digests across the plurality of data stores comprises re-distributing physical storage locations of at least a portion of the file digests pseudo-randomly across the plurality of data stores in the distributed file system.

* * * * *